United States Patent [19]
Chaney

[11] Patent Number: 5,337,145
[45] Date of Patent: Aug. 9, 1994

[54] TWO COMPONENT STRAIGHTNESS INTERFEROMETER APPARATUS FOR MEASURING MOVEMENTS OF PARTS OF A MACHINE

[75] Inventor: Raymond J. Chaney, Berkeley, United Kingdom

[73] Assignee: Renishaw Transducer Systems, Limited, Gloucestershire, United Kingdom

[21] Appl. No.: 12,729

[22] Filed: Feb. 3, 1993

[30] Foreign Application Priority Data

Feb. 8, 1992 [GB] United Kingdom ............. 9202691.3

[51] Int. Cl.$^5$ ............................................... G01B 9/02
[52] U.S. Cl. ..................................... 356/363; 356/358
[58] Field of Search ............... 356/345, 353, 351, 363, 356/358

[56] References Cited

U.S. PATENT DOCUMENTS 1,409,339  3/1922  Fischer .
3,790,284  2/1974  Baldwin .
4,711,576  12/1987  Ban ..................................... 356/353

FOREIGN PATENT DOCUMENTS 8902059  3/1989  European Pat. Off. .

OTHER PUBLICATIONS

Extract from Tokyo Seimitus Catalogue.

*Primary Examiner*—Samuel A. Turner
*Assistant Examiner*—Robert Kim
*Attorney, Agent, or Firm*—Oliff & Berridge

[57] ABSTRACT

A straightness interferometer system for determining the straightness of the relative movement of two machine parts is disclosed in which the required optical elements are combined into two optical components. In particular one optical component consists of a cold light source, a straightness reflector and a detector all combined together, and linked to a remote laser by a fibre optical cable. The other optical component is a beam diverging prism, e.g. a Wollaston prism together with a retroreflector. The advantage, particularly in a moving bed machine, is that the Wollaston prism can be mounted on the fixed spindle, and the light source, straightness reflector and detector are all mounted on the machine bed without the risk of errors occurring due to tilting movements of the bed as it moves.

6 Claims, 1 Drawing Sheet

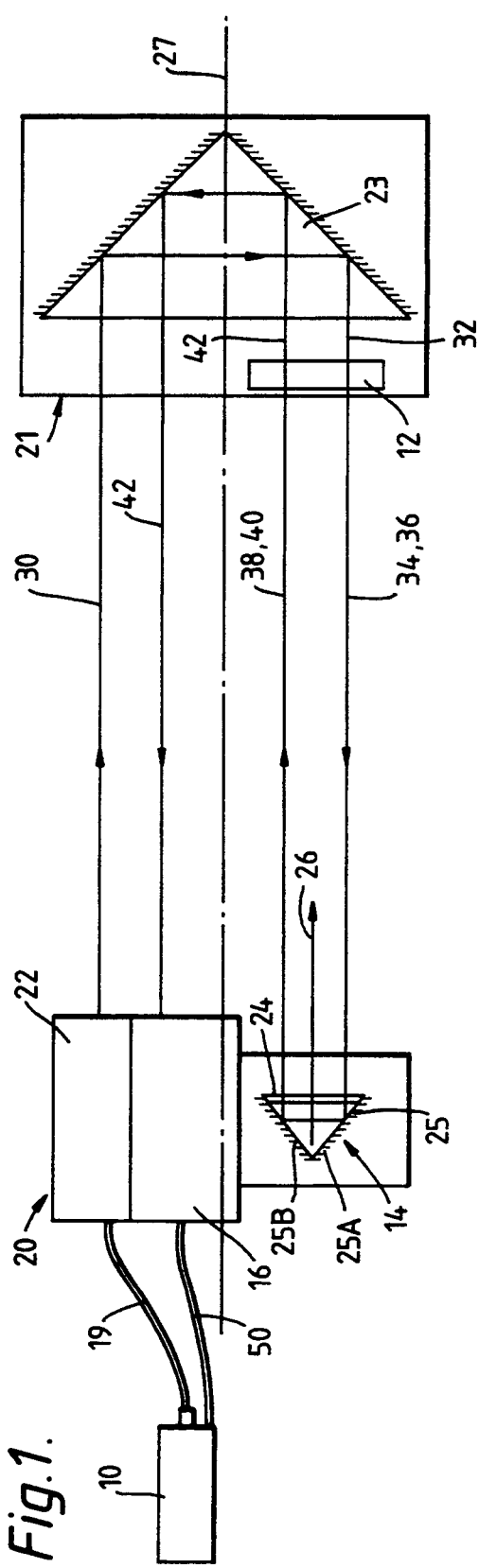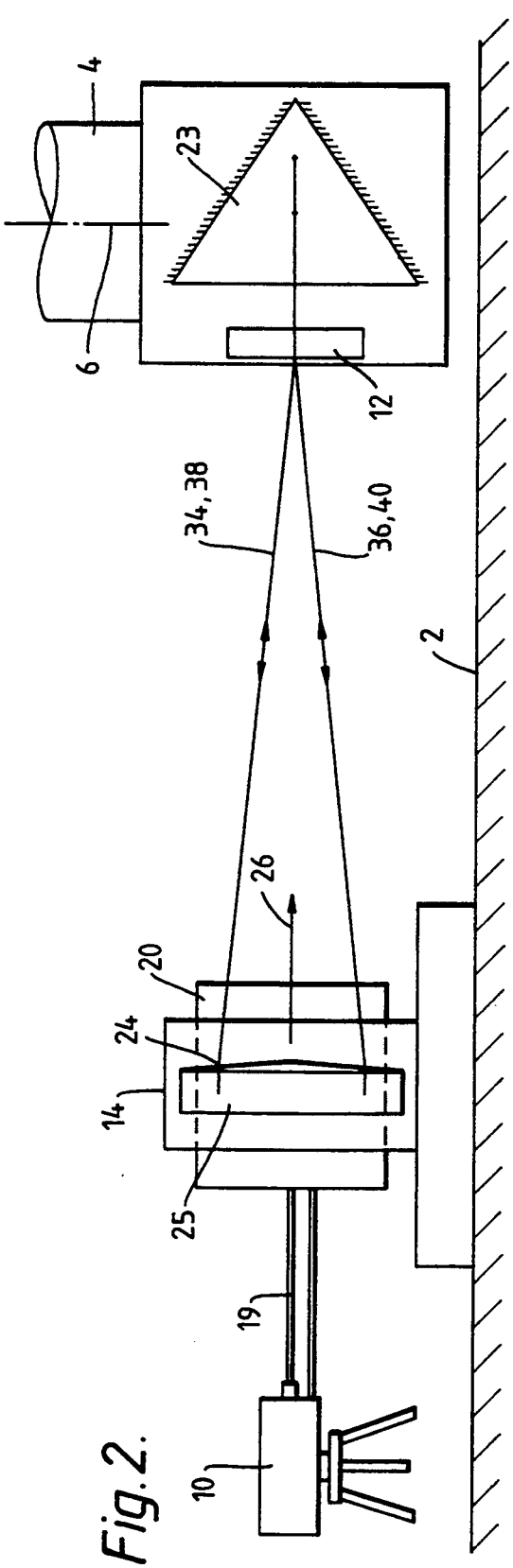

TWO COMPONENT STRAIGHTNESS INTERFEROMETER APPARATUS FOR MEASURING MOVEMENTS OF PARTS OF A MACHINE

The present invention relates to interferometric measurement systems and has particular relevance to such systems for measuring the straightness of the movements of parts of machines. One example of a straightness interferometer is described in U.K. Patent No. 1,409,339.

In general there are four basic elements in a straightness interferometer system for use with machines. The first is a light source, usually a laser, for producing a coherent light beam. Secondly there is provided beam splitting apparatus consisting of an optical component, or group of components, including a prism, which produce from the light beam a pair of divergent light beams directed about a vector which extends parallel to the axis of the machine along which the straightness of the relative movements of the machine parts is to be measured. Thirdly there is provided a straightness reflector, which again consists of an optical component or group of components placed in the path of the diverging light beams, and capable of directing them back along convergent paths to the beam splitting apparatus where they are re-combined into a single beam. Finally a detector system is provided which is positioned to receive the re-combined beam and produce information about the straightness of the machine movements.

Straightness measurements provide information about the deviation from a straight line of the relative movement between a machine bed and a machine spindle. Certain criteria should be observed in order to avoid various forms of error in the measurements.

First of all it is important that the light source and the straightness reflector have a fixed spatial relationship.

It is also important that the light source and the detector have a fixed spatial relationship.

The prism of the beam splitting apparatus should preferably be carried by the machine spindle, because it is important that the deviation from straightness in the relative movement between the spindle and the bed of the machine is measured at the position of the spindle.

It is also preferable that the laser is not mounted on the machine, since it will heat up the machine locally and this can lead to errors in the measurements.

Two basic methods have evolved for making straightness measurements in the horizontal plane using a laser interferometer system. In a machine having a fixed bed and a movable spindle, the prism of the beam splitting apparatus is mounted on the movable spindle and the laser is mounted on a fixed stand adjacent the machine bed. The straightness reflector is mounted on the fixed machine bed, on the opposite side of the spindle to the laser, so that the light beam passes through the beam splitting prism to the reflector. In this arrangement the fixed relationship between the laser and the straightness reflector is maintained, and the detector can also be mounted in fixed relationship to the laser, on the machine bed, or on the laser stand.

In a machine in which the bed is movable and the spindle is fixed however, which is the case in many machine tools, if the prism of the beam splitting apparatus is mounted on the fixed spindle, the laser, the straightness reflector, and the detector all have to be mounted on the machine bed in order to maintain the required fixed relationship therebetween. This can be impractical in some small machines where these components would take up so much space that only a small part of the relative movement between the spindle and the machine bed can be explored. Also the arrangement would require the hot laser to be mounted on the machine bed.

Thus in moving bed machines it is conventional to mount the straightness reflector in the fixed machine spindle and the beam splitting prism on the movable bed. By this means the laser and detector can be mounted on fixed stands adjacent the machine, in order to maintain their fixed relationship with each other, and with the reflector, and the laser does not heat up the machine bed.

However, with this arrangement the deviations from straightness in the relative movement measured by the interferometer will reflect the deviations at the beam splitter position, and not at the spindle position, so that deviations at the spindle position may only be partially corrected.

Also, errors can be introduced in the straightness measurements due to tilting of the bed of the machine as it moves. This can be a particular problem in a machine in which the bed moves on air bearings.

Additionally the setting up of the optical components and the alignment of the laser beam through the prism to the straightness reflector and back to the detector is a time-consuming process.

The present invention proposes in accordance with one aspect thereof the combination of optical units into a novel optical component, and in accordance with another aspect, the use of the optical component in a novel straightness interferometer system.

In a preferred form of the invention, all of the optical units of a straightness interferometer system are combined into only two optical components.

In one embodiment of the present invention an optical component for a straightness interferometer system comprises a cold light source, and a straightness reflector, assembled together.

In another embodiment of the invention, an optical component for a straightness interferometer system comprises a cold light source, a straightness reflector and a detector assembled together.

For the purposes of this specification, a cold light source is to be understood to mean a light source which outputs one or more light beams with a negligible transfer of heat to the machine or the other optical components. Such light sources, for example, would include a beam collimator, or a beam deflector, connected by a fibre optic link to a remote laser, or a cool or cooled laser source e.g. a laser diode.

According to said other aspect of the present invention, a straightness interferometer system for use with a machine having a bed and a spindle which are relatively movable, comprises a first optical component in which a cold light source and a straightness reflector are combined into a single unit, and which is mounted on one of the bed and the spindle, and a second optical component in which a beam diverging prism and a retro-reflector are combined together and mounted on the other one of the bed and the spindle.

Preferably the first optical component is also combined with the detector whereby the fixed relationship between the light source, the straightness reflector and the detector is maintained.

By forming the four basic elements of a straightness interferometer system into two optical component combinations, it becomes possible to overcome the above-mentioned problems of straightness measurement.

For example, in a moving bed machine, the optical component including the cold light source, straightness reflector, and detector can now be mounted on the machine bed without heating the machine bed, and the problem hitherto experienced with a straightness reflector which is fixed to the bed and thus moves relative to a remote laser as the bed tilts can be eliminated.

The invention has application either to a machine tool, with movable or fixed bed, or to a coordinate measuring machine (CMM) which generally has a fixed bed and a movable quill or spindle.

The invention will now be more particularly described by way of example only, with reference to the accompanying drawings in which:

FIG. 1 is a diagrammatic plan view of a straightness interferometer according to the present invention showing the light beam paths through the optical components; and FIG. 2 is an elevation of the interferometer of FIG. 1.

Referring now to FIGS. 1 and 2, there is shown a straightness interferometer system mounted on a machine having a movable bed 2 and a fixed spindle 4. The spindle has a longitudinal axis 6. The interferometer system includes the basic optical elements, that is, a laser 10, a Wollaston prism 12 to provide the divergent light beams, a straightness reflector 14 to return and re-converge the light beams, and a detector 16. In addition, the novel arrangement in this embodiment of the invention requires the presence of an optical fibre 19, a beam collimator 22, which forms a cold light source and a retro-reflector 23 to provide for lateral displacement of the beams.

The optical elements of the present invention are combined into two optical components 20,21, the optical units of which are rigidly connected together. The first optical component 20 comprises three optical units namely, the beam collimator 22, the straightness reflector 14 and the detector 16, and the second optical component 21 comprises two optical units namely, the retro-reflector 23 and Wollaston prism 12.

Following the beam paths around the optical components it can be seen that all of the optical elements are aligned so that the system has a vector 26 aligned with the longitudinal axis 27 of the machine along which the spindle is to be moved.

The optical fibre 19 conveys the laser light beam from the laser to the optical unit 22 which expands the laser beam and produces a collimated output beam 30. The optical unit 22 thus becomes a cold light source which directs output beam 30 towards the retro-reflector 23 and parallel to the axis 27 and vector 26.

The retro-reflector turns the light beam 30 through 180° to produce beam 32. The beam 32 is directed through the Wollaston prism 12 which produces therefrom two divergent beams 34,36 which are divergent and which lie on opposite sides of the vector 26.

The straightness reflector 14 is of the type described in our European Patent Publication No. 88907351.6 and includes a prism 24 mounted together with a retro-reflector 25. The prism is positioned to receive the divergent beams 34,36 from the Wollaston prism and is designed to deflect them into parallelism with the vector 26 of the system and onto the retro-reflector 25.

The two mirrors 25A,25B of the retro-reflector in combination with the prism 24 are positioned relative to the Wollaston prism such that the beams 34,36 incident thereon are reflected thereby so that they return to the Wollaston prism along convergent paths parallel to their incident direction and laterally displaced as return beams 38,40.

At the Wollaston prism the beams 38,40 are re-combined to form a single beam 42 which, on leaving the Wollaston prism, is reflected back by the retro-reflector 23 along a path parallel to the outgoing beam 30 and towards the detector 16. The beam 42 by virtue of the above-described beam path arrangement, contains information as to the straightness of any movement of the machine spindle 4 in the direction of the axis 27, and this information is decoded from the beam 42 by the detector 16 which outputs a signal indicative of the deviation of the movement of the spindle from a true straight path.

The output signal is passed to further signal processing electronics which may form part of the detector or may be an additional component of the overall system placed alongside the laser 10 or at some other location remote from the detector, and connected thereto via a cable or a further optical fibre link 50.

Several advantages flow from the above-described arrangement.

Firstly, the laser is placed at a location remote from the machine and thus the light source 20 is cold avoiding any problem caused by heating of the machine parts by the laser.

Secondly, by combining the straightness reflector, the detector and the cold light source, the problem of relative movements between the source and the straightness reflector, and between the source and the detector is eliminated. This combination therefore allows the light source and the straightness reflector to be mounted on the movable machine part so that the Wollaston prism can be mounted on the spindle to eliminate errors in the straightness measurement due to pitching of the machine bed as described above. This combination therefore fulfils an important requirement that the light beam from the cold light source maintains a fixed spatial relationship with the machine part to which it is attached.

Third, the alignment of the optical units is eased when only two optical components are involved.

In an alternative arrangement the optical component comprising the cold source, straightness reflector, and detector can remain fixed, to avoid the fibre optic cable and other leads trailing over the machine. Thus in a fixed bed machine, this unit can be mounted adjacent the machine bed on a stand so that the whole of the working volume of the machine can be checked for straightness errors in the movement of the spindle. In the case of a moving bed machine, this unit can be fixed to the spindle, so that only one unit remains to be positioned on the machine bed and more of the working volume of the machine is available for checking than has been possible with prior art systems.

Also by putting the light source on the spindle and the beam splitting prism on the moving machine bed, it is possible to determine the straightness of the movement of the machine bed at a position other than the spindle position.

What is claimed:

1. A straightness interferometer having a bed and a spindle, the interferometer measuring movements of the bed and the spindle, the interferometer comprising:
   a first optical component mounted on one of said bed and said spindle, the first optical component comprising a light source and a straightness reflector; and
   a second optical component mounted on the other one of said bed and said spindle, the second optical component comprising a beam diverging prism and a retro-reflector,
   wherein the first optical component emits an incoming light source towards the second optical component, the second optical component producing two diverging beams from the incoming light beam and directing the two diverging beams towards the first optical component, the first optical component reflecting the two diverging beams towards the second optical component, the second optical component combining the beams into a single outgoing beam, the single outgoing beam containing information indicative of the movements of the bed and the spindle.

2. The straightness interferometer of claim 1, wherein the first optical component further comprises a detector receiving the outgoing beam from the second optical component and outputting a signal indicative of the movements of the bed and the spindle.

3. The straightness interferometer of claim 1, wherein a fibre optic cable connects a laser to the light source.

4. The straightness interferometer of claim 1, wherein the light source is a beam collimator.

5. The straightness interferometer of claim 1, wherein the light source is a laser diode.

6. The straightness interferometer of claim 1, wherein the light source emits the incoming light beam towards the second optical component, the beam diverging prism producing the two diverging beams from the incoming light beam and the retro-reflector directing the two diverging beams towards the straightness reflector, the straightness reflector reflecting the two diverging beams towards the second component, the diverging prism combining the beams into the single outgoing beam and the retro-reflector directing the single outgoing beam to a detector.

* * * * *